(12) United States Patent
Arndt et al.

(10) Patent No.: US 9,683,555 B2
(45) Date of Patent: Jun. 20, 2017

(54) WIND POWER INSTALLATION WITH HELICOPTER HOISTING PLATFORM

(75) Inventors: Joachim Arndt, Loxsted (DE); Ansgar Kohne, Loxstedt Stinsteat (DE)

(73) Assignee: AREVA Wind GmbH, Bremerhaven (DE)

( * ) Notice: Subject to any disclaimer, the term of this patent is extended or adjusted under 35 U.S.C. 154(b) by 477 days.

(21) Appl. No.: 13/997,751

(22) PCT Filed: Dec. 27, 2011

(86) PCT No.: PCT/EP2011/074078
§ 371 (c)(1),
(2), (4) Date: Aug. 12, 2013

(87) PCT Pub. No.: WO2012/089726
PCT Pub. Date: Jul. 5, 2012

(65) Prior Publication Data
US 2013/0315735 A1 Nov. 28, 2013

(30) Foreign Application Priority Data
Dec. 27, 2010 (EP) .................................... 10016098

(51) Int. Cl.
| F03D 11/04 | (2006.01) |
| F03D 80/00 | (2016.01) |
| F03D 13/20 | (2016.01) |
| F03D 80/50 | (2016.01) |

(52) U.S. Cl.
CPC .............. *F03D 11/04* (2013.01); *F03D 13/20* (2016.05); *F03D 80/00* (2016.05); *F03D 80/50* (2016.05); *Y02E 10/726* (2013.01)

(58) Field of Classification Search
CPC ........ F03D 11/00; F03D 11/04; F03D 11/045; F03D 11/05; F03D 1/003; B64F 1/007; Y02E 10/726
USPC ................................... 290/44, 55; 416/146 R
See application file for complete search history.

(56) References Cited

U.S. PATENT DOCUMENTS

| 4,311,434 A | 1/1982 | Abe |
| 5,301,626 A * | 4/1994 | Penny ..................... B63B 19/19 114/201 R |
| 6,827,032 B1 * | 12/2004 | Wobben .................. B63B 22/02 114/230.1 |
| 8,371,820 B2 | 2/2013 | deBuhr et al. |

(Continued)

FOREIGN PATENT DOCUMENTS

| DE | 20205396 U1 | 11/2002 |
| EP | 1101934 A2 | 5/2001 |

(Continued)

OTHER PUBLICATIONS

Machine Translation of DE 20205396, published Nov. 14, 2002.*

(Continued)

*Primary Examiner* — Mark Laurenzi
*Assistant Examiner* — Mickey France
(74) *Attorney, Agent, or Firm* — Carlson, Gaskey & Olds, PC

(57) ABSTRACT

A wind power installation includes a helicopter hoisting platform configured to be arranged on top of a nacelle of a wind driven power plant. The nacelle and the helicopter platform are configured such that a bottom surface of the helicopter hoisting platform is below a top surface of the nacelle.

16 Claims, 16 Drawing Sheets

(56) References Cited

U.S. PATENT DOCUMENTS

| 2007/0110578 | A1* | 5/2007 | Stommel | F03D 1/065 |
| | | | | 416/132 B |
| 2009/0129931 | A1 | 5/2009 | Stiesdal | |
| 2011/0097202 | A1 | 4/2011 | De Buhr et al. | |

FOREIGN PATENT DOCUMENTS

| EP | 1783366 A1 | 5/2007 |
| JP | 2005-007950 | 1/2005 |
| JP | 2010-184631 | 8/2010 |
| WO | 2004/003381A1 A1 | 1/2004 |
| WO | 20009/132671 A2 | 11/2009 |

OTHER PUBLICATIONS

European Search Report dated May 21, 2012, from corresponding PCT/EP2011/074078, filed Dec. 27, 2011.
English version of JP office action dated Jul. 1, 2014.
E1a: Excerpt of magzine "Wind Power Monthly", vol. 24, No. 6, Jun. 2008.
E1b: Excerpt of magzine "Wind Power Monthly", vol. 24, No. 9, Sep. 2008.
E1c: Excerpt of magzine "Wind Power Monthly", Oct. 2009.
E2a: Printout of the website: https://picasaweb.google.com/118020786600305855611/HornsRevWindfarm.
E2b: Printout of one of the pictures shown in document E2a.
E2c: Printout of a second picture shown in document E2a.
Observations by a Third Party Under Article 115 EPC, received Jul. 19, 2013.

* cited by examiner

WIND POWER INSTALLATION WITH HELICOPTER HOISTING PLATFORM

TECHNICAL FIELD

The invention relates to a helicopter hoisting platform, and more specifically to a wind power installation comprising a helicopter hoisting platform for a nacelle of a wind driven power plant. The invention also relates to a hatch cover for a wind driven power plant.

BACKGROUND

Wind is one of the most important renewable energy technologies. Wind turbines (also referred to as a wind driven power plants or wind energy converters) are more and more arranged in large-scale offshore wind parks. There are many technical challenges relating to these offshore wind parks, as for example the assembly of parts and the transport, the erection of the wind turbine in the sea and the maintenance of the wind driven power plants.

WO 2009/132671 A2 discloses a wind energy installation with a nacelle with a paneling. The paneling is configured with a hatch opening that is arranged in the paneling covering surface. The hatch opening is sufficiently large in dimension to allow components to be removed or introduced in an upward direction from the top into the nacelle over the whole area of the drive train of the wind energy installation. The hatch opening can be opened and closed by a hatch cover that is configured to be slid as a whole along the top of the nacelle. Furthermore, a helicopter hoisting platform is provided on top of the nacelle and the cover is configured to slide below the hoisting platform in order to open the hatch. It is an object of the invention to provide a wind power installation for a nacelle of a wind driven power plant with a helicopter hoisting platform allowing the wind power installation or its parts to be easily transported, assembled and mounted, in particular for offshore wind parks. The helicopter hoisting platform generally serves to hoist persons down to the platform on the nacelle. The purpose may be all kinds of inspection or data collection from sensors of the nacelle.

SUMMARY

It is an object of the invention to provide a wind power installation for a nacelle of a wind driven power plant with a helicopter hoisting platform and/or a hatch cover of a nacelle allowing the wind power installation or its parts to be easily transported, assembled and mounted, in particular for offshore wind parks.

According to one example, there is a wind power installation comprising a helicopter hoisting platform and a nacelle for wind driven power plant. The nacelle and the helicopter platform may then be configured such that a bottom surface of the helicopter hoisting platform is lower than a top surface of the nacelle. This may also be referred to as an at least partial integration of the helicopter hoisting platform into the nacelle in a vertical direction.

In the context of this specification, a longitudinal direction is the direction in which the hub of a nacelle horizontally extends. A transversal direction is perpendicular to the longitudinal direction but in the same rather horizontal plane. The vertical direction is then perpendicular to the longitudinal and transversal direction. The vertical direction is the direction of a central axis of a tower of a wind driven power plant in the installed and erected position. The helicopter hoisting platform may then be configured to extend over the nacelle in the longitudinal direction.

According to one example, there is a wind power installation comprising a helicopter hoisting platform and a nacelle for a wind driven power plant. The nacelle and the helicopter hoisting platform may then be configured to at least partially integrate the helicopter hoisting platform into the nacelle. Integrating the helicopter hoisting platform into the nacelle may be understood such that at least the bottom surface of the platform is lower than the top surface of the nacelle. The helicopter hoisting platform can be integrated in different directions or dimensions. One dimension may be the integration in the vertical direction, another in the longitudinal direction, still another in the transversal direction.

The helicopter hoisting platform may be considered as a distinct, for example, basically parallelepiped element having a bottom surface or wall, a top surface or wall and side walls (for example four side walls but there may be more) extending from the bottom wall in the vertical direction. The nacelle may then be considered as a second distinct part with a bottom, side walls, and top surface, top wall. The nacelle may provide a recess for accommodating at least a part of the helicopter hoisting platform.

The nacelle and the helicopter platform may then be configured to at least partially integrate the helicopter hoisting platform into the nacelle in the longitudinal direction. "Partially" integrating the helicopter hoisting platform into the nacelle means that at least one or more sides/walls of the helicopter hoisting platform extend over the top surface of the nacelle. The top surface of the nacelle can be understood as the most elevated main top level surface of the nacelle in assembled and installed position. Advantageously, the top surface may be the surface having an opening being covered by a roof or hatch for providing access to an inner space of the nacelle.

The degree or depth of integration may be determined as a function of the space required for hoisting a person from a helicopter on the platform and a minimum distance between the platform and an end (also tip or top) of a tower on which the nacelle is to be mounted.

These aspects of the invention provide that the leverage of the platform with respect to the coupling of the nacelle to the tower can be substantially reduced. Weight and complexity of the structure of the nacelle and the bearing and fixation between tower and nacelle can be simplified.

The size and amount of integration of the helicopter hoisting platform may also be a function of the size of a gearbox and/or a generator assembly.

Furthermore, a safety distance from wind rotor blades with respect to the helicopter has to be preserved. The minimum size of the platform must be configured such that a person with necessary equipment and tools as well as replacement parts for the wind power plant can be accommodated.

According to one example, the top level of the helicopter hoisting platform may substantially be on the same level with the top level of the nacelle. This already provides a high level of integration of the hoisting platform and simplifies the passage of persons from the platform to the nacelle.

The platform may be fully integrated into the nacelle in the longitudinal, vertical and/or transversal direction. In other words, even if the helicopter hoisting platform is integrated in the vertical direction, it may overlap the nacelle in the longitudinal and/or transversal direction. In other embodiments, the helicopter hoisting platform may be integrated in the longitudinal direction but partially or completely overlap the top surface and/or side walls of the nacelle in the transversal and/or vertical direction. Advantageously, the platform only overlaps in the longitudinal direction and is narrower than the nacelle in the transversal direction.

In one example, the top level of the helicopter hoisting platform may even be lower than the top level of the nacelle. This aspect of the invention provides that the level of integration of the hoisting platform is even higher than for even levels of the top surfaces. The frame structure of the nacelle and the coupling to the tower may then be more simplified.

Furthermore, there may be a corridor for passing from the helicopter hoisting platform to the nacelle. This aspect is particularly useful in order to provide a safe passage from the platform to the nacelle. If the level of the platform is below the level of the nacelle, the corridor may be integrated into the nacelle or platform. The side walls may then not extend from the nacelle and/or the platform. In terms of wind forces and exposure of the nacelle and the platform, a recessed corridor can be advantageous.

According to one example, the helicopter hoisting platform may be further configured to extend beyond the nacelle opposite to and away from a rotor of the wind driven power plant. This can also be referred to as an overlap of the helicopter hoisting platform in the longitudinal direction away from the rotor of the wind driven power plant. The platform may be partially integrated into the nacelle.

The dimensions of the nacelle may then be reduced in order to reduce the weight and size of the nacelle. The platform extending beyond the nacelle may then still provide enough space and a safety margin for hoisting persons from a helicopter or any other aircraft.

The helicopter hoisting platform may advantageously extend the nacelle by one meter or more. The overlap or extension may be in the longitudinal or transversal direction. In an advantageous embodiment the overlap may be in the longitudinal direction and away from the rotor of the wind driven power plant.

These aspects of the invention provide that the weight of the nacelle and the helicopter platform are substantially reduced. Due to the rotor of the helicopter, a minimum distance between the rotor of a wind driven power plant with a helicopter hoisting platform and the rotor of the helicopter has to be maintained and ensured. However, according to this aspect of the invention, the nacelle does not support the helicopter hoisting platform over the full length of the nacelle. The main body of the nacelle or a part of the nacelle can be shorter than the helicopter hoisting platform in longitudinal direction. The weight of the nacelle and/or the helicopter hoisting platform can then be substantially reduced. Transport, assembly and erection of the wind power installation with the helicopter hoisting platform (and/or the nacelle and may be some other parts) may then be simplified and costs can be reduced.

In another aspect of the invention, the helicopter hoisting platform is narrower than the nacelle in the transversal direction. This further reduces weight.

In another example, the wind power installation comprises a hatch cover for a hatch of a nacelle. The nacelle of a wind driven power plant may then have a hatch opening located on a top side of the nacelle. The hatch opening is located on the top side after installation of the power plant. The hatch cover may then comprise several segments configured to remain within the hatch opening when the hatch (i.e. also the hatch cover) is in an open position. Accordingly, a hatch cover is provided that allows opening of a hatch in a nacelle without requiring additional space outside the hatch opening for accommodating the hatch cover.

The hatch cover according to the these aspects of the invention is particularly advantageous in combination with the helicopter hoisting platform. The hatch cover having several segments configured to remain within a hatch opening when the hatch is in open position does not require any additional space laterally around it.

Therefore the hoisting platform can be arranged closer to the central axis of the tower of the wind driven power plant. Due to integration of the platform in the nacelle, the platform can be arranged closer to the coupling point between the nacelle and the tower.

In one example, the segments of the hatch cover are in an upright position, when the hatch cover is in the open position. "Upright" position means that the segments are in a substantially vertical position. An upright or vertical position of the segments reduces the required space for the segments in the open position.

The segments may be pivotably or rotatably mounted on the nacelle. The segments of the hatch cover may be movable in a transversal or longitudinal direction. This allows moving the segments/hatch cover within the hatch opening.

In one example, the hatch cover may then be configured to require a rotation of the segments and then a longitudinal or transversal movement of the segments with respect to the nacelle for opening the hatch.

In an example embodiment, the rotation may have to be performed before any transversal or longitudinal movement of the segments is possible.

In another example embodiment, the rotation may have to be performed after a transversal or longitudinal movement of the segments.

The segments of the hatch cover may be rectangular. The segments of the hatch cover may be pivotable around individual longitudinal axes.

The segments may be configured to move along a common transversal or longitudinal axis.

The segments may be configured to move along a common transversal or longitudinal axis, when they are in an upright position and/or close together.

The segments may be configured to be pivotable with respect to each other along first and second edges at which the segments are coupled to each other.

In an advantageous embodiment, the number of segments may be four.

The hatch cover may be configured as a folding roof. The folding roof concept is advantageous, as the segments remain within the opening of the hatch. Furthermore, the segments assume an at least partially upright position. This minimizes the required space for the hatch cover in the open position.

The hatch cover segments may be configured to be reeled in and reeled out around a rotation axis for opening and closing the hatch. The drive mechanism may then be coupled to the rotation axis for reeling the hatch cover segments. In this embodiment the segments are moved away from the hatch opening but not outside the hatch opening. The segments may still be rotated by the reeling around an axis and they can assume an upright position. Otherwise, they may be reeled around the axis and remain there. Also, this position minimizes the required space for the segments in the open position of the hatch.

The wind power installation may be a wind driven power plant (also referred to as wind turbine or wind energy converter).

The wind power installation may be an offshore wind park comprising wind driven power plants in accordance with the above aspects of the invention.

The invention also provides a nacelle being configured to accommodate a helicopter hoisting platform and/or a hatch cover in accordance with the aspects and embodiments described hereinabove.

The invention further provides a helicopter hoisting platform configured to be mounted to a nacelle in accordance with the aspects and embodiments described hereinabove.

These and other features may be best understood from the following drawings and specification.

BRIEF DESCRIPTION OF THE DRAWINGS

Further aspects and characteristics of the invention will ensue from the following description of preferred embodiments of the invention with reference to the accompanying drawings, wherein.

DETAILED DESCRIPTION

Figure 1:
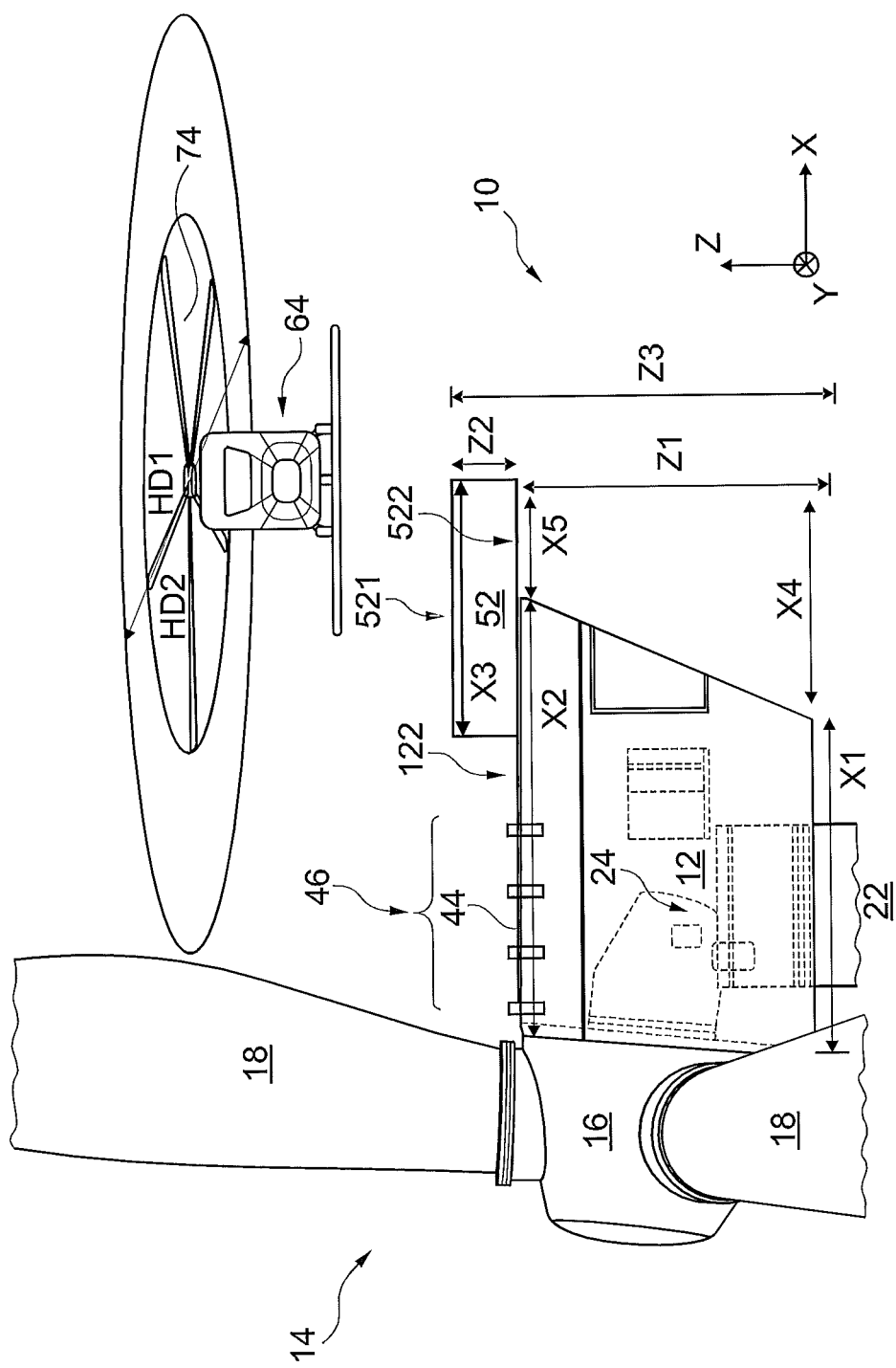
FIG. 1 is a side view of an embodiment of a wind driven power plant according to aspects of the invention.

FIG. 1 is a side view of an embodiment of a wind power installation. In this embodiment, a helicopter hoisting platform 52 is placed on top of the nacelle. This means that a bottom surface 522 of the helicopter hoisting platform 52 is mounted on top of the top surface 122 of the nacelle 12. The top surface 521 of the helicopter platform 52 is not on the same level with the top surface 122 of the nacelle. The overall construction height is then Z3. However, the nacelle 12 can be short in the longitudinal direction X. There is a longitudinal direction X, a transversal direction Y, as well as a vertical direction Z indicated by respective arrows X, Y and Z. The length of the nacelle 12 may then be X2 on the top side and X1 on the bottom side of the nacelle. X1 and X2 may be different. In particular, X1 may be shorter than X2. This means that the overlap X5 of the helicopter platform 52 may be shorter with respect to the top side of the nacelle than with respect to the bottom side. The overlap with respect to the bottom side may be X4. The height of the nacelle may be Z1. The height of the helicopter platform 52 may be Z2. The total construction height is then Z3 (Z3=Z1+Z2). An advantage of the embodiment shown in FIG. 1 consists in the possibility to mount or simply plug the helicopter hoisting platform on top of an existing or already assembled nacelle.

Figure 2:
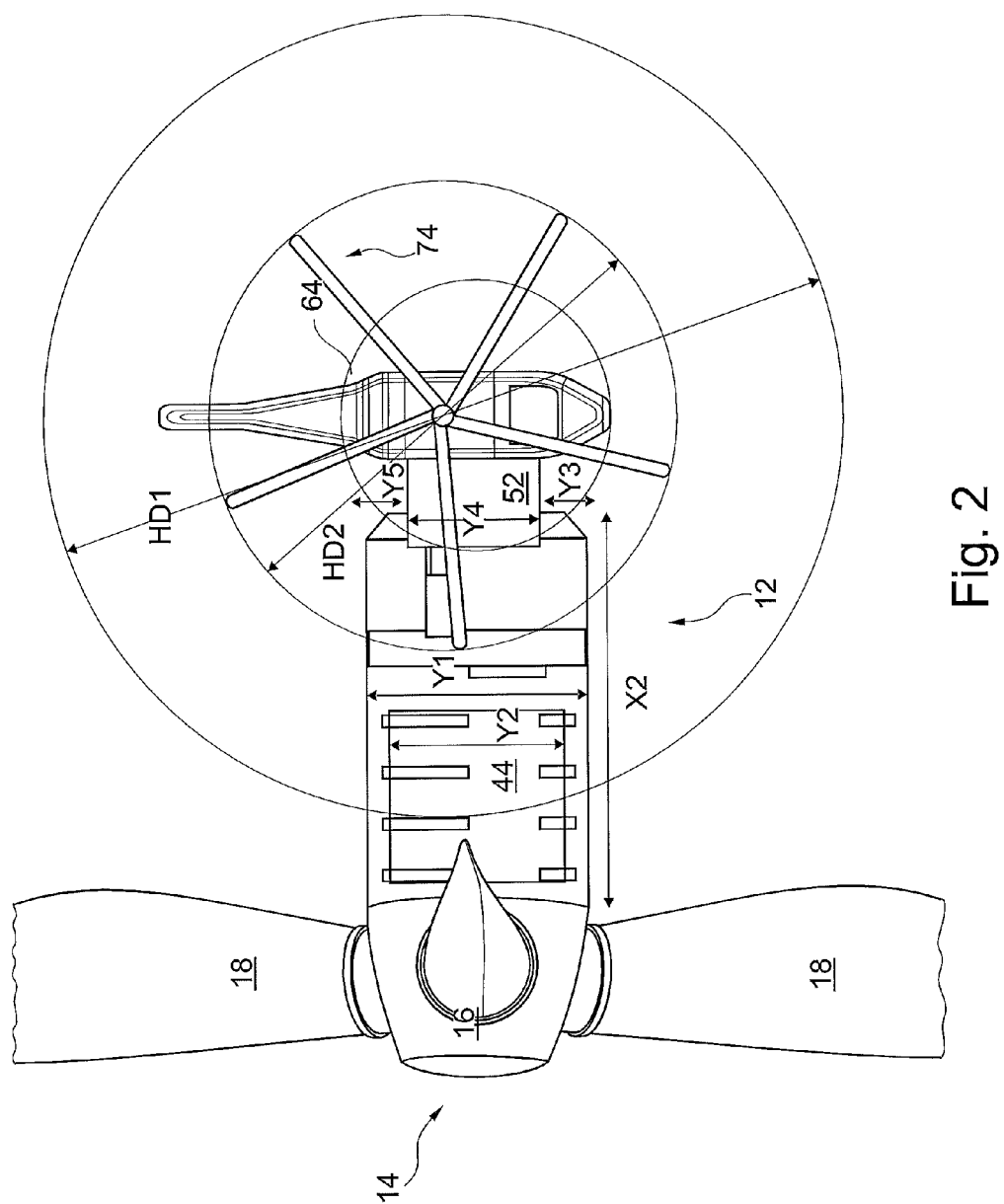
FIG. 2 is a top view of the embodiment shown in FIG. 1.

FIG. 2 shows a top view on the embodiment of FIG. 1. The helicopter hoisting platform 52 is narrower than the nacelle 12 in the transversal direction. The distance between the outer edges of the nacelle 12 in transversal direction is Y3 and Y5. The total width of the helicopter hoisting platform 52 is Y4. The width of the hatch opening 46 is Y2 similar to the width of the hatch cover 44.

Figure 3:
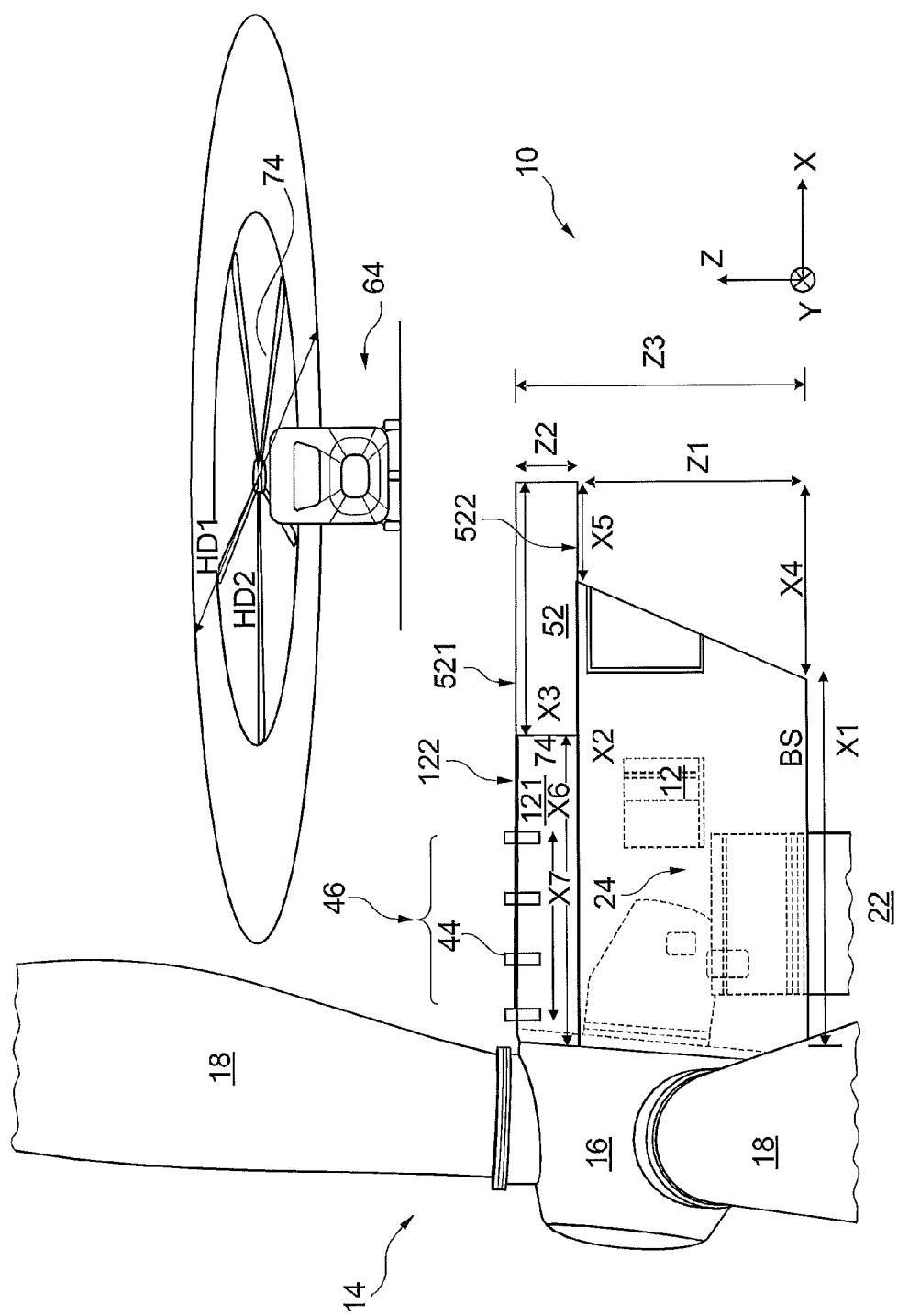
FIG. 3 is a side view of an embodiment of a wind driven power plant according to aspects of the invention.

FIG. 3 is a side view on an embodiment of a wind power installation (e.g. wind driven power plant) 10 according to aspects of the invention. The wind driven power plant 10 comprises a nacelle 12, a rotor 14 with a hub 16 and rotor blades 18. The nacelle 12 is mounted on the tower 22. In the shown installation position of the wind driven power plant 10, the helicopter hoisting platform 52 is arranged on the top side of the nacelle 12. The helicopter platform 52 extends beyond the nacelle 12. There is a longitudinal direction X, a transversal direction Y, as well as a vertical direction Z indicated by respective arrows X, Y and Z. The dimensions of the nacelle are X1 on the bottom side and X2 on the top side. The height of the nacelle from the bottom side to the level on which the helicopter hoisting platform 52 is mounted is Z1. The total height of the nacelle is Z3. The height of the helicopter hoisting platform 52 is Z2. A top portion 121 of the nacelle is shorter in longitudinal direction than the length X2 of the top side of the nacelle 12. The length of the top portion 121 in longitudinal direction is X6. X6 is lower than X2. There is a hatch opening 46 (not visible in this side view) and a hatch cover 44 (also not visible in this side view). The dimension in longitudinal direction of the hatch opening and also the hatch cover are X7. X7 is lower than X6. The length of the overlap of the helicopter hoisting platform 52 beyond the nacelle 12 in longitudinal direction X is X5 at the top side of the nacelle. X5 is advantageously greater than 1 m and between 2 m and 3 m in this embodiment. The distance between the bottom side BS of the nacelle 12 and the outer edge of the helicopter hoisting platform 52 in longitudinal direction is X4. X4 is greater than X5. The height of section 121 of the nacelle 12 is Z4. The height of the helicopter hoisting platform 52 is Z2. Z4 is substantially equal to Z2. This means that the helicopter hoisting platform 52 can be partially integrated on top of the nacelle 12.

The top level of the portion 121 of the nacelle 12 (at the level of the hatch opening 46 and the hatch cover 44) is at the same level with the top side 521 of the helicopter hoisting platform 52. The bottom surface 522 of the helicopter hoisting platform 52 is lower than the top surface 122 of the nacelle. In this embodiment, the helicopter hoisting platform 52 is fully integrated into the nacelle in the vertical direction (Z). However, in the longitudinal direction X, the helicopter hoisting platform 52 is only partially integrated. This means that the helicopter hoisting platform 52 overlaps the body of the nacelle by a length X5 in longitudinal direction.

The helicopter hoisting platform 52 may generally be arranged with respect to the nacelle 12, such that the bottom surface 522 of the platform 52 is lower than the top surface 122 of the nacelle 12. An integration or partial integration of the platform 52 in longitudinal direction X is not necessary. However, in terms of stability and weight distribution, it can be advantageous to integrate the platform 52 at least partially in vertical direction (Z direction) and longitudinal direction (X direction).

The nacelle 12 is then configured to provide a recess for accommodation a part of the helicopter platform 52. The recess may be shorter in longitudinal direction X than the total length X3 of the helicopter hoisting platform 52. The height Z4 of the recess may be similar to the height Z2 of the helicopter hoisting platform. However, Z4 may also be greater than Z2 or Z4 may be lower than Z2 as long as Z4 is greater than zero.

This provides that the construction height Z3 is lower than the construction height of a wind power plant having a helicopter hoisting platform on top of the nacelle 12. The helicopter platform 52 is not entirely supported by the nacelle 12. In the region of the overlap of the helicopter hoisting platform 52 (along the distance X1 in longitudinal direction X) the helicopter hoisting platform is not supported by any substructure. This construction reduces the weight of the nacelle and still provides enough distance from rotor 14 and the rotor blades 18 to allow the helicopter 64 to land on the helicopter hoisting platform 52.

The position and length of the helicopter hoisting platform 52 is dimensioned with respect to the diameter of the helicopter rotor 74. An additional safety margin requires that the minimum diameter around rotor 74 HD1 is greater than HD2. HD1 may be 23.3 m for a rotor diameter of 11 m.

Figure 4:
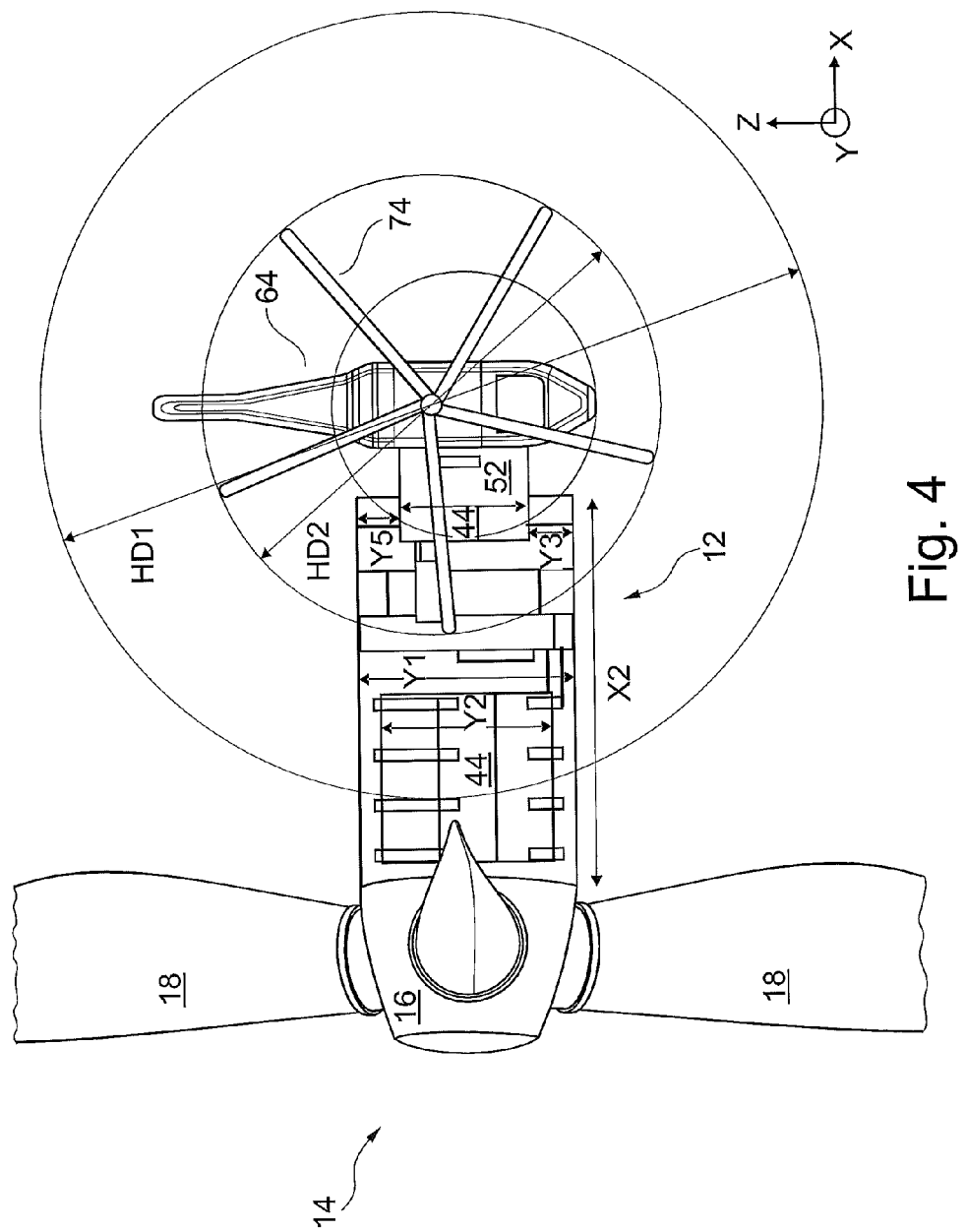
FIG. 4 is a top view of the embodiment shown in FIG. 3.

FIG. 4 is a top view of the embodiment shown in FIG. 3. The longitudinal direction X, the transversal direction Y and the vertical direction Z are indicated by arrows X, Y and Z. From this perspective it becomes apparent that the helicopter hoisting platform 52 of this embodiment is narrower in the Y-direction than the nacelle 12. The distances between the outer edges of the nacelle are Y3 and Y5. The length in the transversal direction of the helicopter hoisting platform is Y4. The distances Y3 and Y5 are about or greater than 0.5 m. This reduces the weight of the nacelle 12 in combination with the helicopter hoisting platform 52. The transversal dimension of the hatch opening 46 and hatch cover 44 are Y2. They extend over most of the width Y1 of the nacelle 12.

Figure 5:
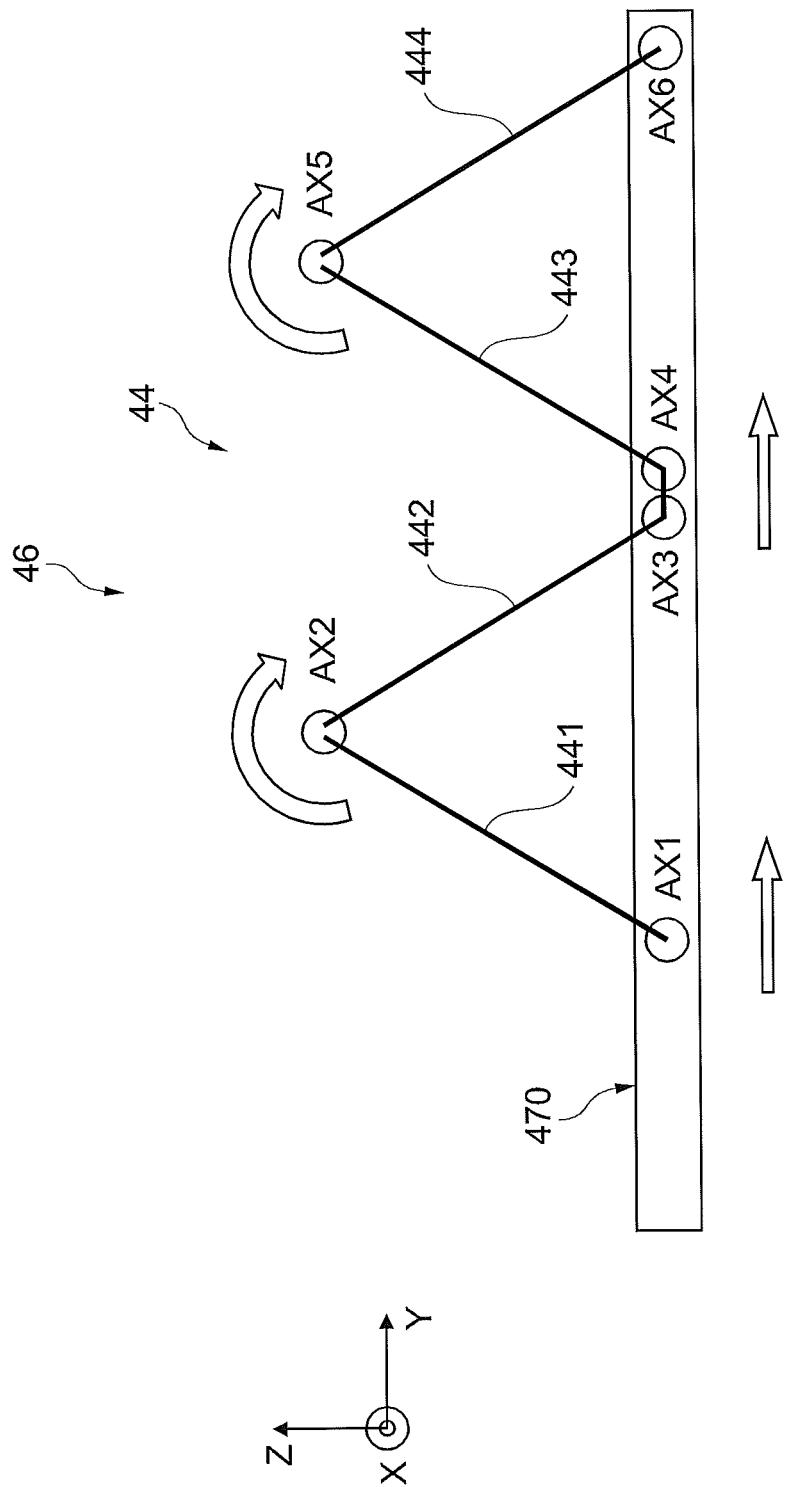
FIG. 5 is a simplified schematic cross-sectional side view on a hatch cover according to a first embodiment of the invention.

FIG. 5 shows a simplified schematic cross-sectional side view of a hatch cover 44 according to a first embodiment of the invention. The longitudinal direction X, the transversal direction Y and the vertical direction Z are indicated by arrows X, Y, Z in accordance with the other drawings. The hatch cover 44 of this embodiment comprises four basic segments 441, 442, 443 and 444. The segments 441 to 444 are coupled such that the segments can rotate with respect to each other. This allows the hatch cover 44 to be folded like a folding roof. There are four segments 441 to 444, and rotational axes AX1, AX2, AX3, AX4, AX5, AX6. The coupling between the segments 441 to 444 is basically provided by axes AX2, AX3, AX4 and AX5. In a different embodiment, AX3 may be equal to AX4. AX1 and AX2 are the end coupling mechanisms coupling the ends of segments 441 and 444 to a rail 470. The cover 44 is shown in the half-folded state. The rotational axes AX1 to AX6 extend in longitudinal direction X of the nacelle. The hatch cover 44 opens in transversal direction Y of the nacelle. However, in another embodiment, the hatch cover 44 may open in longitudinal direction and the axes may be arranged in transversal direction X.

Figure 6:
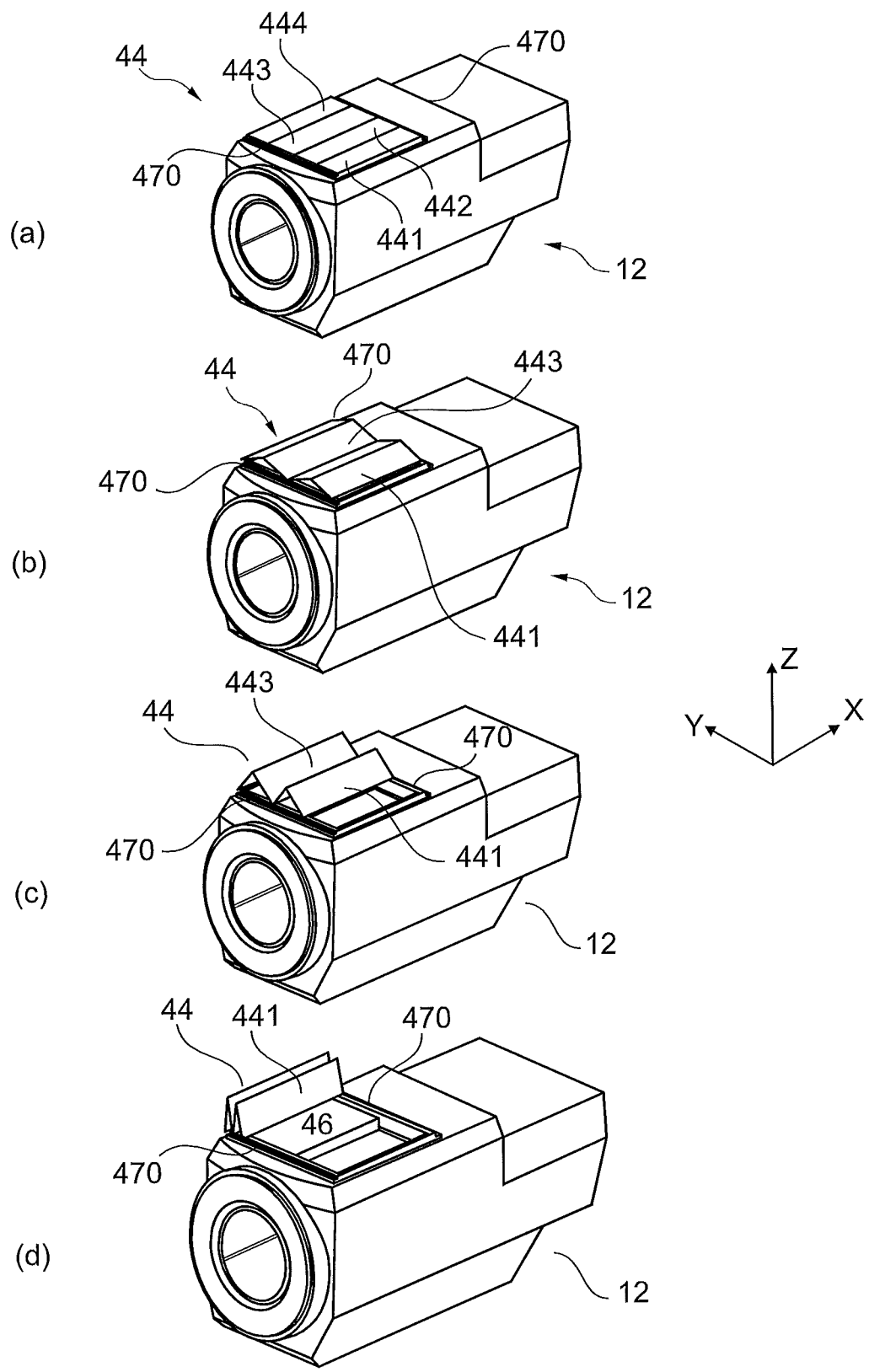
FIG. 6 is a sequence of perspective views of a nacelle illustrating the opening of the hatch cover of the first embodiment of the invention.

FIG. 6 shows a sequence of perspective views of a nacelle illustrating the opening of the hatch cover of the first embodiment of the invention. There are four steps (a), (b), (c) and (d). In state (a), the hatch cover 44 is closed. In the closed state, segments 441 to 444 are all in horizontal position, i.e. in the X-Y plane. In state (b), the hatch cover 44 starts opening which means that segments 441, 442, 443 and 444 fold and rotate with respect to each other. The segments 441 to 444 are rotatably guided in the rails 470 on both ends of the hatch cover. In state (c), the hatch cover 44 is partially opened and the segments 441 to 444 started moving in transversal direction Y. In state (d), the hatch cover 44 is open. Segments 441 to 444 are basically in an upright position (in vertical direction Z also indicated by arrows X, Y, Z in accordance with the other drawings). The segments 441 to 444 are standing upright (almost vertical in Z-direction) side by side and as close as possible but still allowing a stable upright stand. Although the hatch opening 46 is now almost entirely opened, the hatch covers 441 to 444 are still within the area of the hatch opening 46. This means that the hatch cover remains within the area of the hatch opening even in the open position (d). For closing the hatch cover, the procedure is reversed from steps (d) to (a). Opening and closing the hatch cover 44, requires a rotational movement of each segment 441 to 444 and a transversal (or in another embodiment in a longitudinal) movement of the segments. After a certain amount of rotation, the segments 441 to 444 move along a common transversal axis for opening and vice versa for closing.

Furthermore, once segments 441 to 444 are in the upright position, the segments 441 to 444 may be moved from one side of the hatch opening 46 (as shown in FIG. 6 (d)) to the opposite side or any other position within the hatch opening 46. This provides that, even though the space required by the upright segments 441 to 444 is small, the whole package of segments 441 to 444 can be moved to any other position within hatch opening 46 in order to provide any required space for accessing the inner space of the nacelle through the hatch opening 46.

Figure 7:
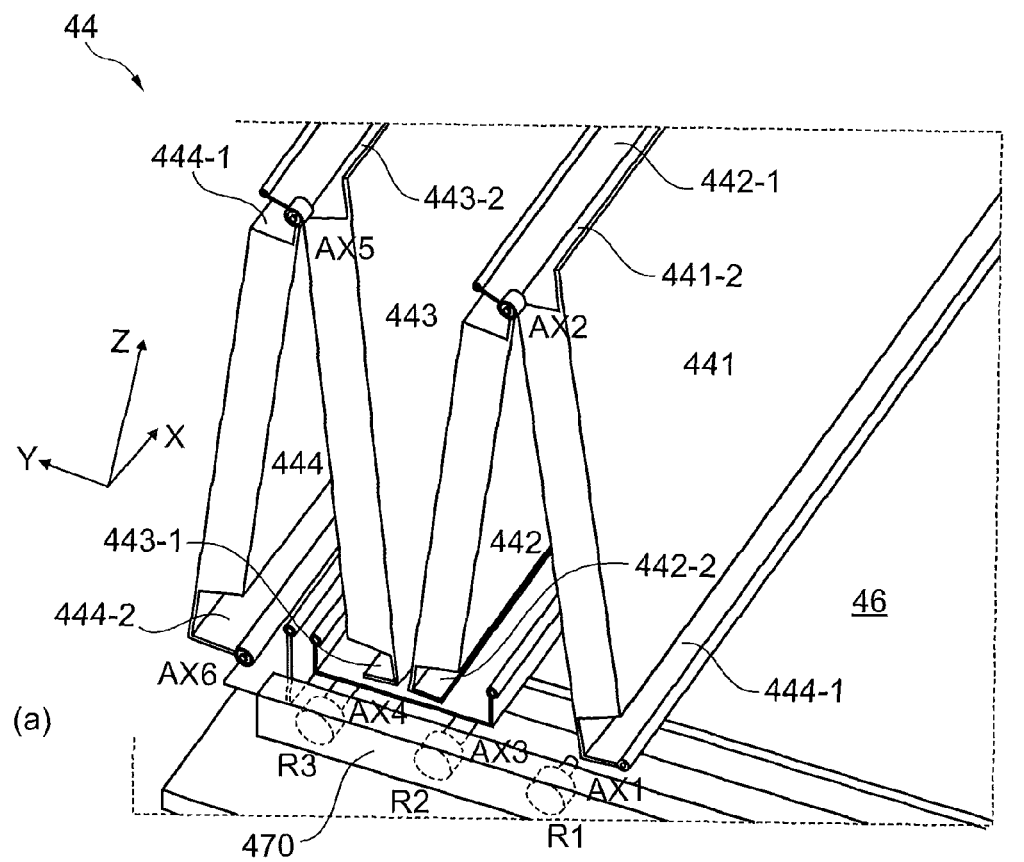
FIG. 7 is a simplified perspective and a simplified side view of the opened hatch cover of the first embodiment of the invention.
Figure 7:
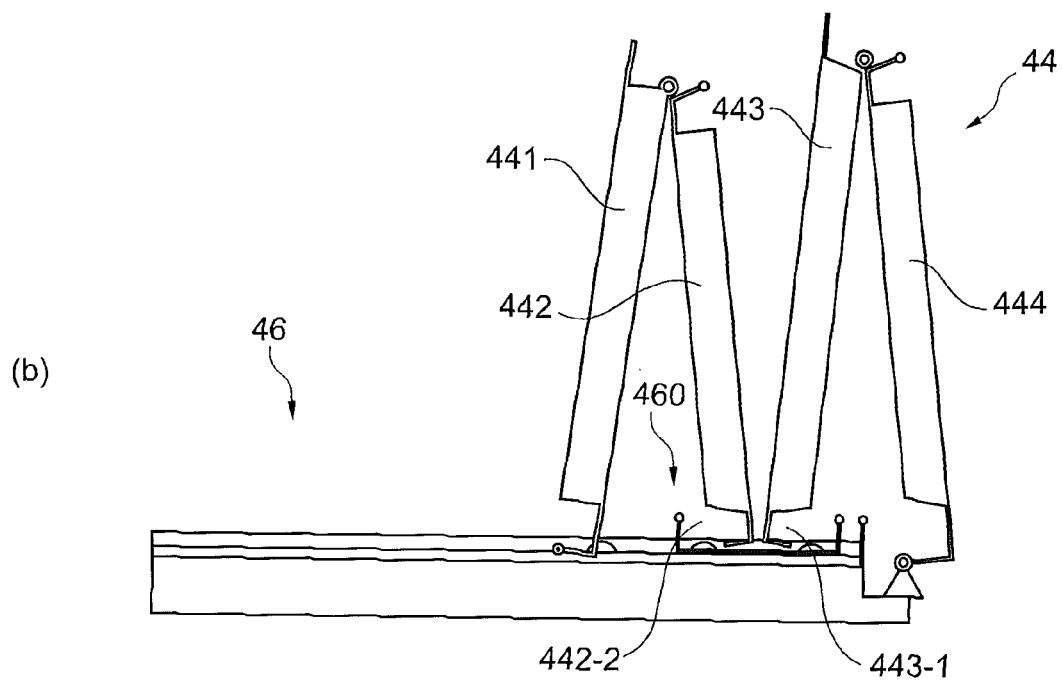

FIG. 7 is a simplified perspective and simplified side view of the opened hatch cover of the first embodiment of the invention. FIG. 7(a) shows the perspective view on the hatch cover 44 in the open position. The segments 441, 442, 443 and 444 are standing almost upright. The segments 441 to 444 have rotated around axes AX1, AX2, AX3, AX4, AX5 and AX6. The rotation axes AX1 to AX6 extend in longitudinal direction X and the segments are upright in vertical direction Z. The segments are folded and have moved in transversal direction Y. There are rolls R1, R2 and R3 for guiding the segments movably in the rail 470. Each segment 441 to 444 has extensions on both sides. These extensions have either hook like shape with a sealing edge or they are straight. Hook like extensions are 441-1, 442-1, 442-2, 443-1, 444-1 and 444-2. Segments 441 and 443, i.e. the first and the third segment, have one side with a straight extension which is not hook like shaped. The second and fourth segment 442 and 444 have hook like extensions on both sides. Hook like shaped means that the main plate of a segment is extended by a thin plate which is then continued by a perpendicular plate having a length that corresponds to the thickness of the segment. The hook-like shaped extensions serve to engage with the other segments in the closed position and provide a strong sealing of the roof.

FIG. 7(b) shows a simplified side view of the open cover hatch 44 of the first embodiment. Segments 441, 442, 443 and 444 are basically upright, but not entirely. The hook like extensions 442-2 and 443-1 are carried in a carrier 460. The hook like extensions 442-2 and 443-1 are configured to engage with the side walls of the carrier 460. A central carrier 460 is provided to couple the middle segments 442 and 443. This provides improved sealing. The central carrier is slidably supported (on rolls) on the supporting frame of the hatch. This provides an improved sealing mechanism and still allows folding of the segments 441 to 444 with respect to each other.

Figure 8:
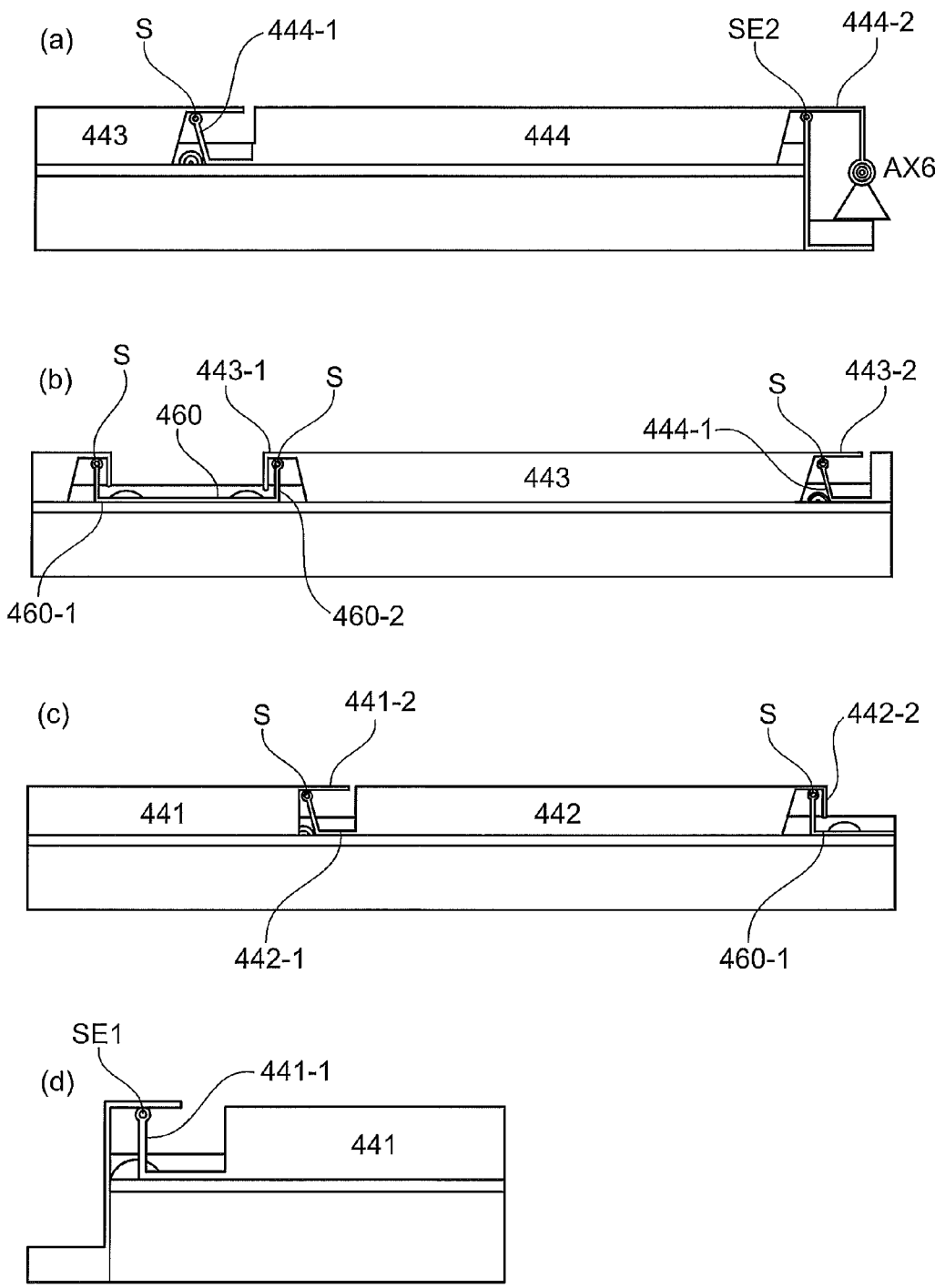
FIG. 8 is a sequence of simplified schematic cross-sectional side views of the closed hatch cover of the first embodiment of the invention.

FIG. 8 is a sequence of simplified schematic cross-sectional side views of the closed hatch cover of the first embodiment of the invention. FIG. 8 shows how the segments 444 to 441 are engaged with respect to each other in the closed position of the hatch cover 44. There are various sealing edges S (may also be referred to as gaskets). Sealing edges are provided at hook like extension 44-1, the carrier side walls 460-1 and 460-2, hook like extension 442-1 and hook like extension 441-1. The sealing edges S are configured to support and to carry the extensions of adjacent segments. The sealing edges SE1 and SE2 are arranged to interact with the outer frame of the hatch cover.

Figure 9:
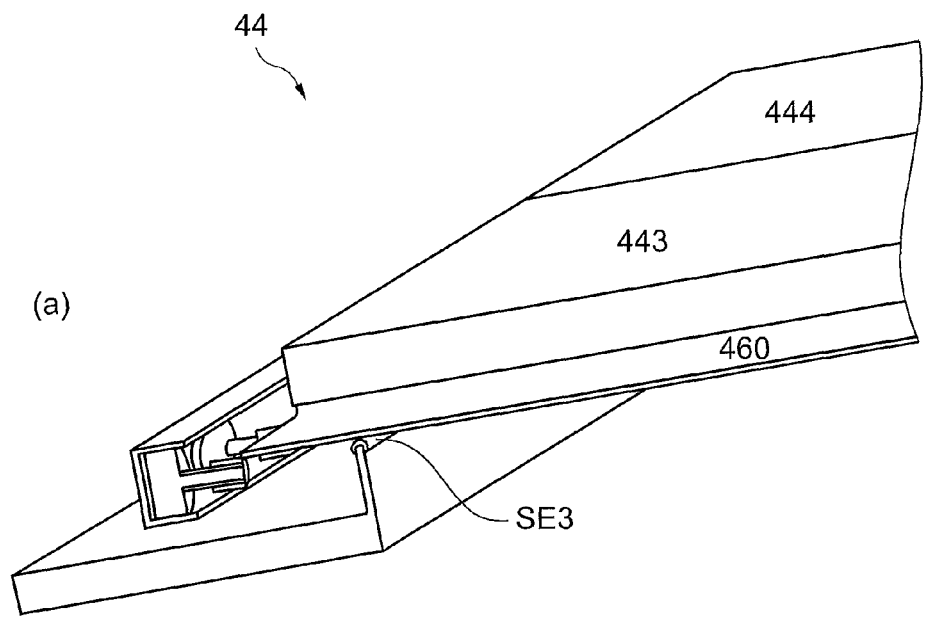
FIG. 9 is a simplified schematic cross-sectional perspective and side view on the closed hatch cover of the first embodiment of the invention.
Figure 9:
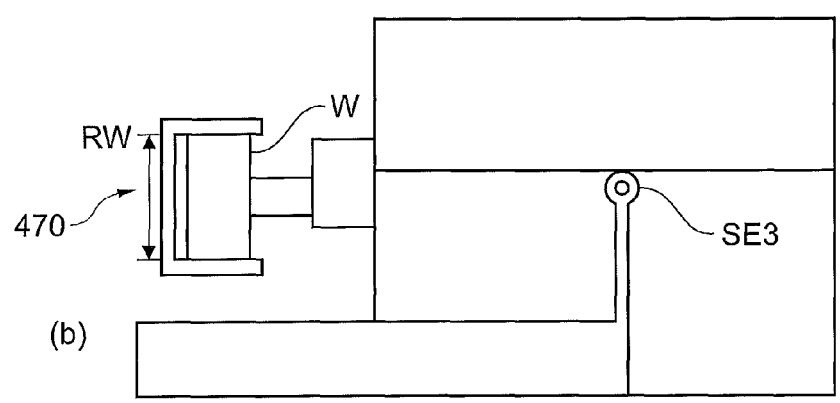

FIG. 9 is a simplified schematic cross-sectional perspective and side view of the closed hatch cover of the first embodiment of the invention. FIG. 9(a) shows how the sealing edge SE3 supports the hatch cover 44 or more specifically the segments of the hatch cover in the closed position. FIG. 9(b) shows a cross-sectional view of the closed hatch cover and in particular sealing edge SE3 carrying the segments. The folding roof or folding hatch cover according to the first embodiment of the invention is configured to remain within the hatch opening 46 when it is in the open position. Furthermore, the segments 441 to 444 only move in upward (Z) direction (when they rotate) which means that the sealing edge SE3 can be fixed. FIG. 9(a) shows that the sealing edge SE3 supports the carrier 460. Furthermore, FIG. 9(b) shows that the rail 470 is U-shaped. The wheel W basically extends over the full inner width RW of the U-shaped rail 470.

Figure 10:
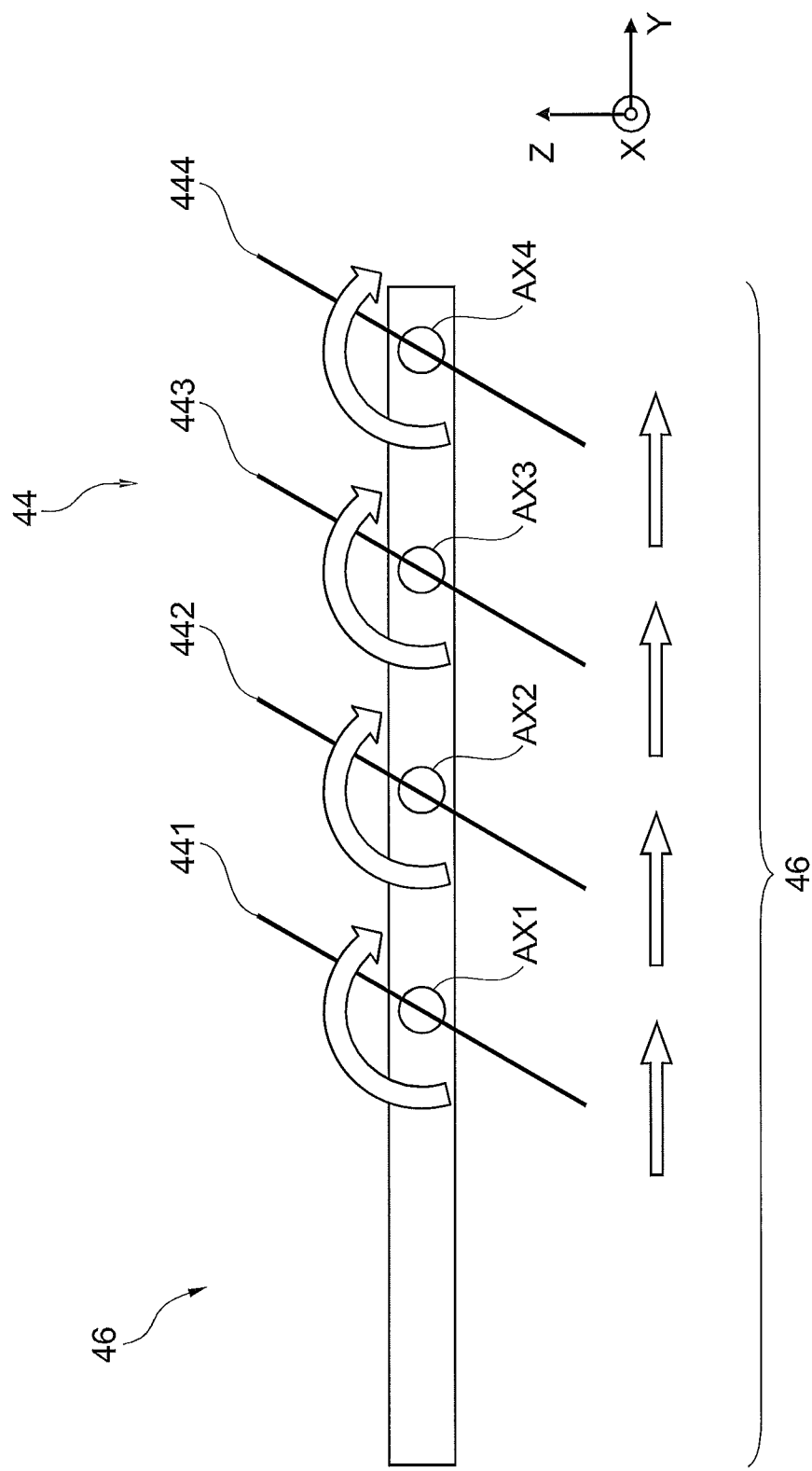
FIG. 10 is a simplified schematic cross-sectional side view on a hatch cover according to a second embodiment of the invention.

FIG. 10 is a simplified schematic cross-sectional side view of a hatch cover according to a second embodiment of the invention. The hatch cover also comprises four segments 441, 442, 443 and 444. The segments are pivotable around axes AX1, AX2, AX3 and AX4. Each axis AX1, AX2, AX3 and AX4 is an individual rotation axis for each segment 441, 442, 443 and 444, respectively. In order to open the hatch cover 44, the segments 441 to 444 are rotated as indicated by the arrows around the axes AX1 to AX4 and may then be moved in the transversal direction Y.

Figure 11:
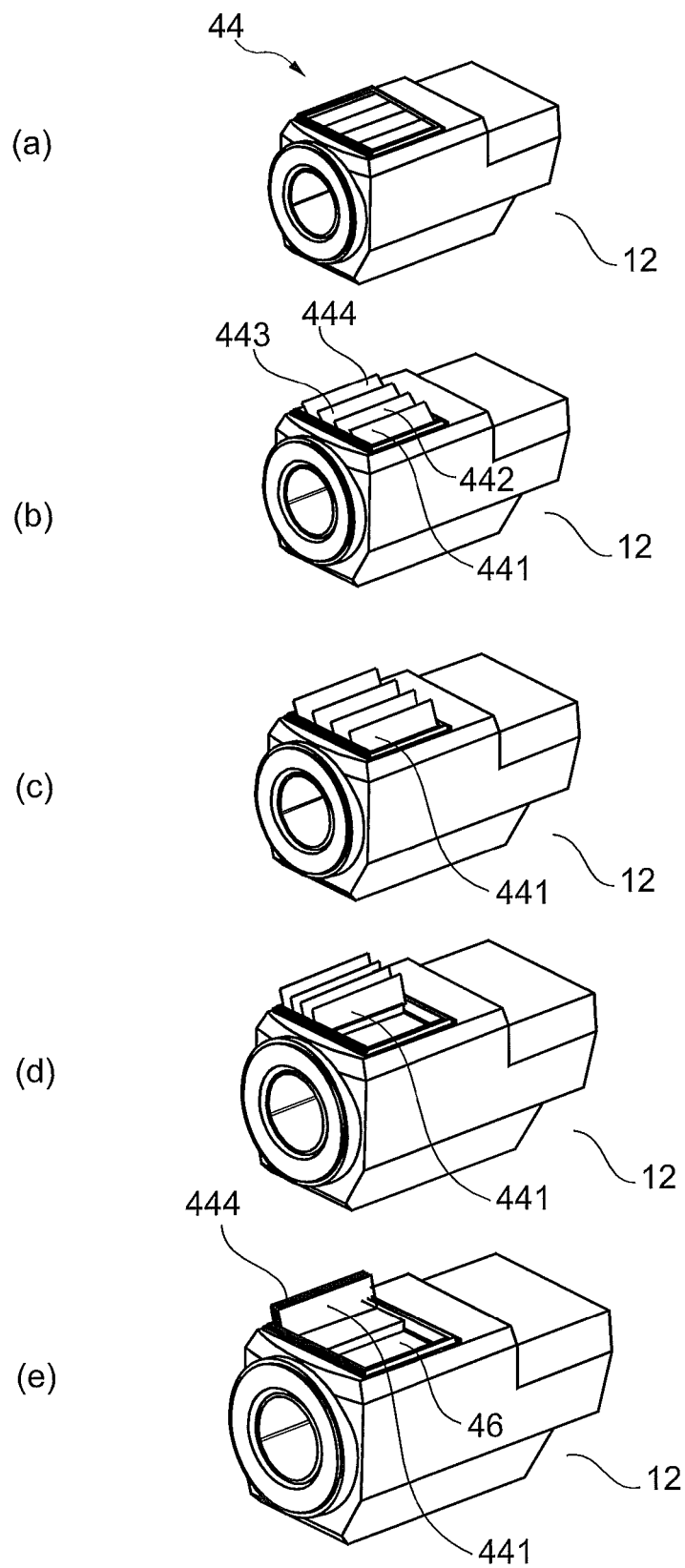
FIG. 11 is a sequence of perspective views of a nacelle illustrating the opening of the hatch cover of the second embodiment of the invention.

FIG. 11 is a sequence of perspective views of a nacelle with a hatch cover illustrating the opening of the hatch cover of the second embodiment of the invention. FIG. 11(a) shows the hatch cover 44 in a closed state. From FIG. 11(b) to FIG. 11(e) the hatch cover 44 opens step by step to be then completely open in FIG. 11(e). The segments 441 to 444 are already in an almost upright position in FIG. 11(c). In the open position FIG. 11(e), the segments 441 to 444 are still within the area of the opening 46. However, since they are in the upright position, they occupy only a very small area almost all of the area of the hatch opening 46 is accessible. Steps (a) to (e) would be reversed for closing the hatch cover 44.

Segments 441 to 444 may be in the upright position. In this upright position, the segments 441 to 444 can be moved from one side of the hatch opening 46 (as shown in FIG. 11 (e)) to the opposite side or any other position of the hatch opening 46. This provides that, even though the space required by the upright segments 441 to 444 is small, the whole package of segments 441 to 444 can be moved to any other position within hatch opening 46 in order to provide any required space for accessing the inner space of the nacelle through the hatch opening 46.

Figure 12:
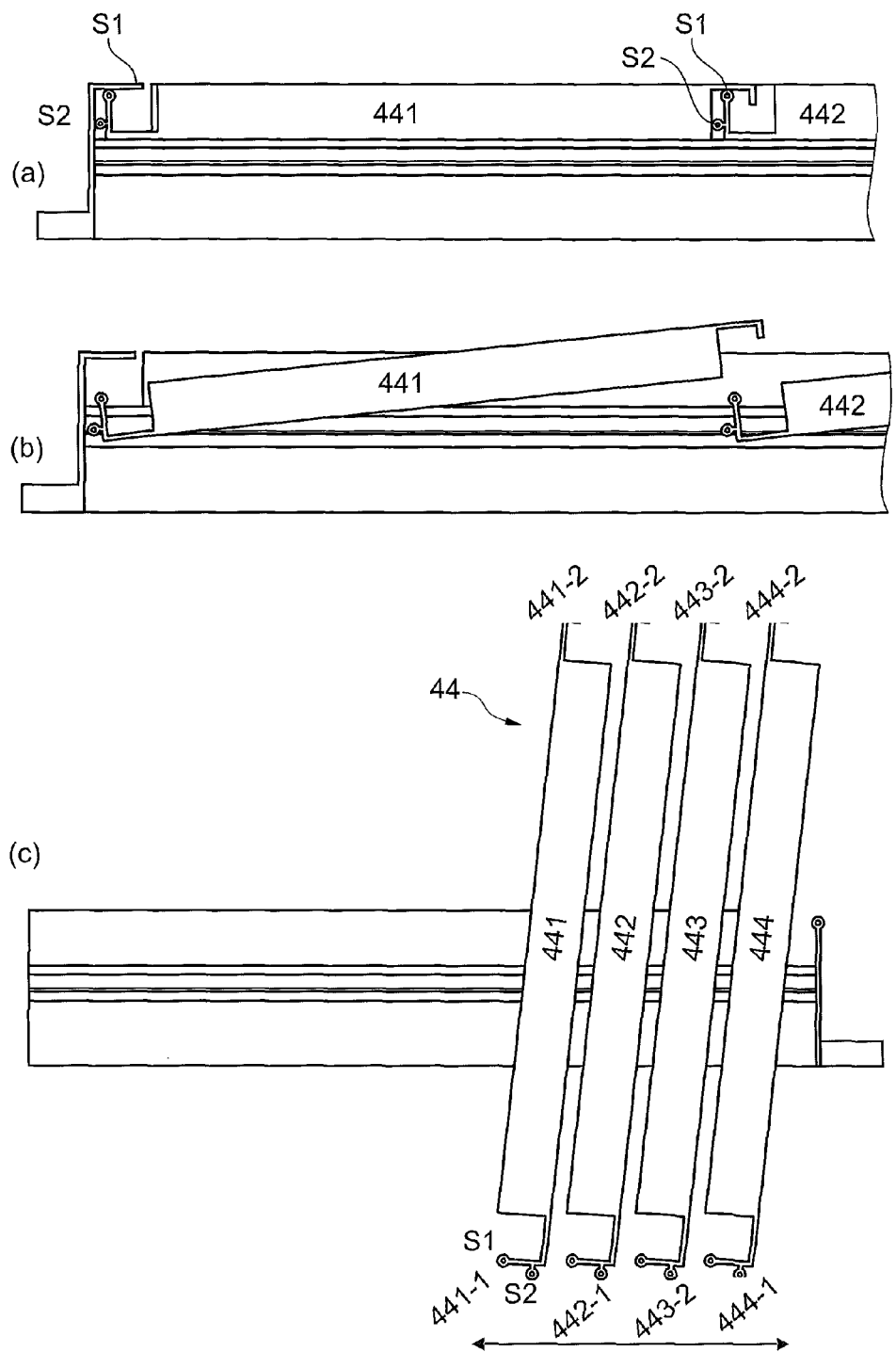
FIG. 12 is a sequence of simplified cross-sectional side views of the second embodiment of the hatch cover.

FIG. 12 is a sequence of simplified cross-sectional side views of another embodiment of the hatch cover. There are three states of the hatch cover 44 (a), (b), (c). State (c) shows the little space that is occupied by the upright segments 441 to 444 in the open position. Each segment 441 to 444 has two hook like extensions 441-1, 441-2, 442-1, 442-2, 443-1, 443-2, 444-1, 444-2. The small circles on hook like extensions 441-1, 442-1, 443-1 and 444-1 indicate sealing edges (or gaskets). Accordingly, only one side of segments 441 to 444 is provided with sealing edges (gaskets). The other side is configured to engage with the sealing edges (gaskets) of the respective other side of an adjacent segment. The sealing edges S1 and S2 are indicated for segment 441 but they are also present at segments 442, 443 and 444. The sealing edges are represented as little circles. Sealing edge S1 is configured to push vertically against the hook like extension of the adjacent segment or the frame of the hatch cover. The frame is part of the nacelle 12. The sealing edge S2 is configured to push against the adjacent segment in a horizontal direction. This provides a double sealing if the hatch cover 44 is closed.

Figure 13:
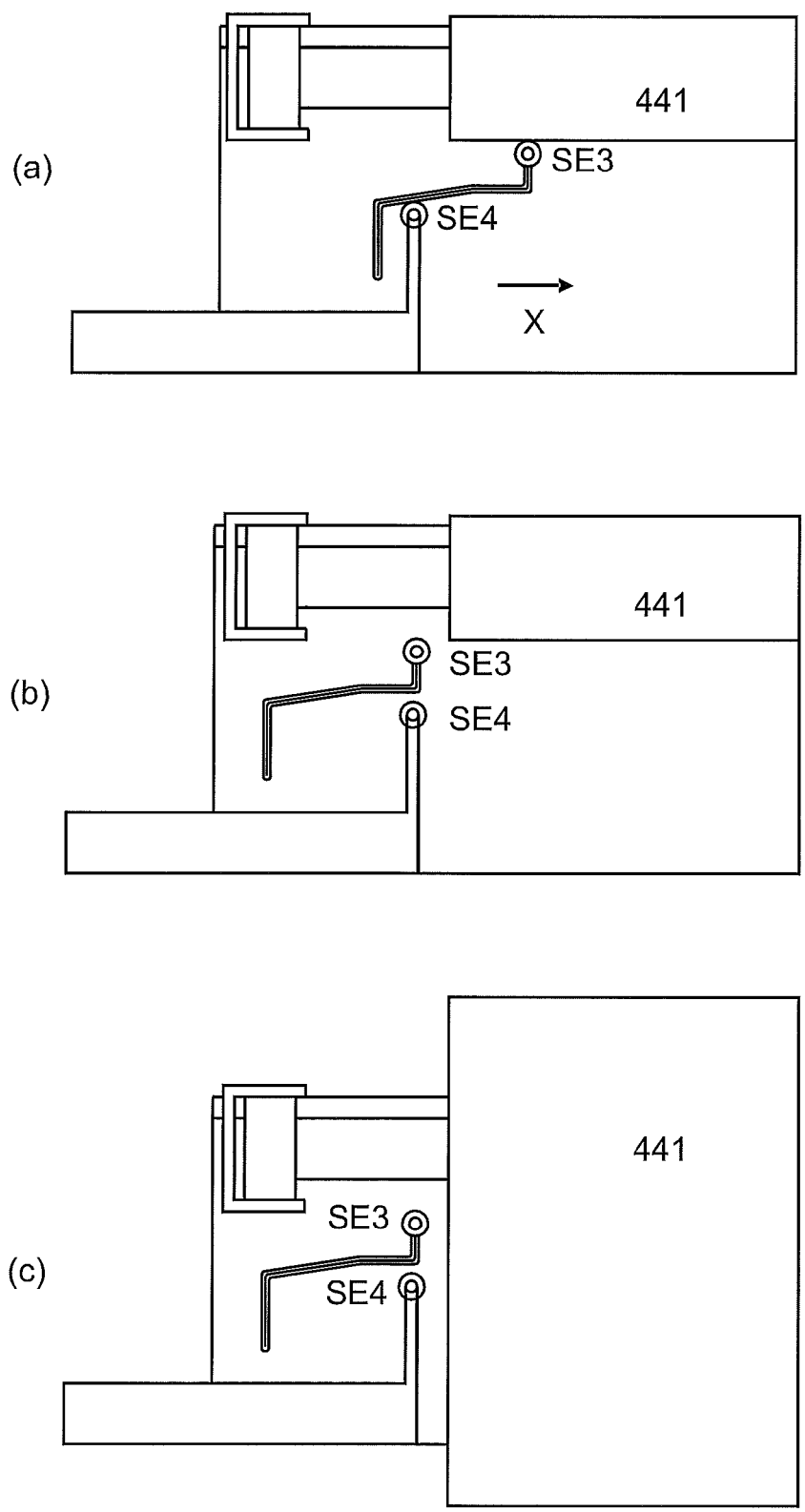
FIG. 13 is another sequence of simplified cross-sectional side views of the second embodiment of the hatch cover.

FIG. 13 is another sequence of simplified cross-sectional side views of the second embodiment of the hatch cover. There is a further sealing edge SE3, which is part of the frame of the nacelle. The second embodiment of the hatch cover 44 requires that this sealing edge SE3 is removed in longitudinal direction in order to enable the segments (here only shown for segment 441) to turn. A further sealing edge SE4 is then necessary to make sure that the hatch cover is safely sealed in the closed position.

Figure 14:
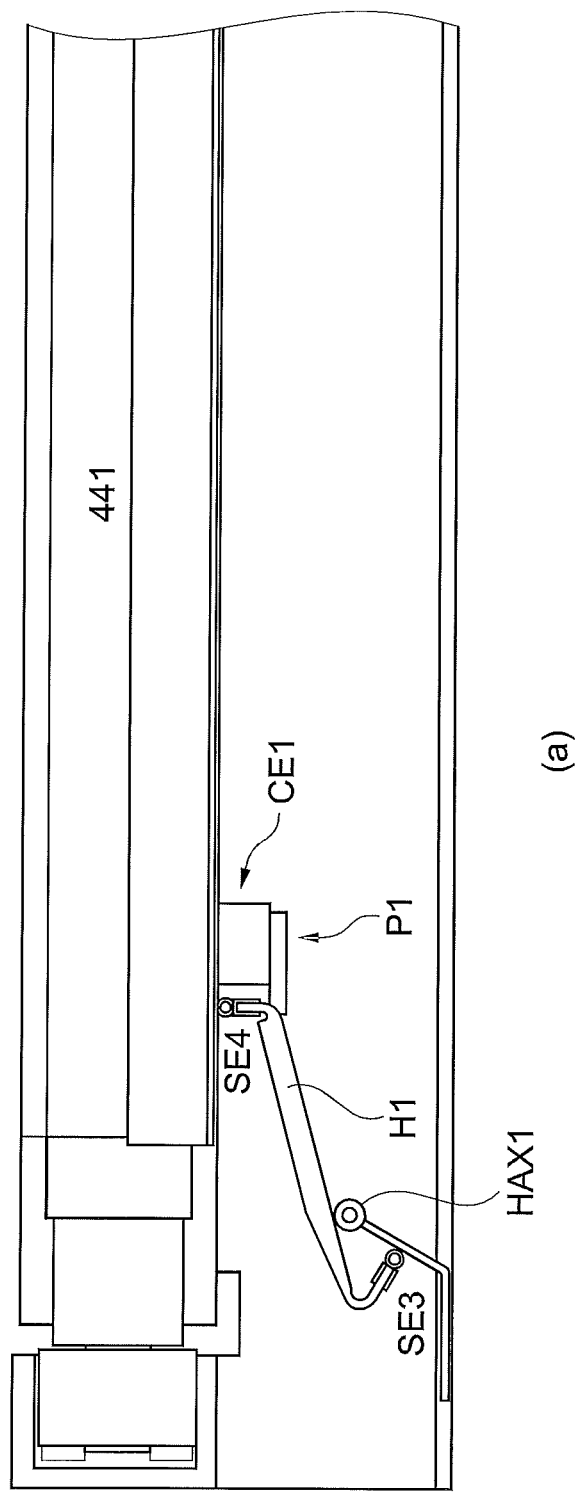
FIG. 14(a) is another sequence of a simplified cross-sectional side view of an embodiment of the hatch cover.
FIG. 14(b) is another sequence of a simplified cross-sectional side view of an embodiment of the hatch cover.
Figure 14:
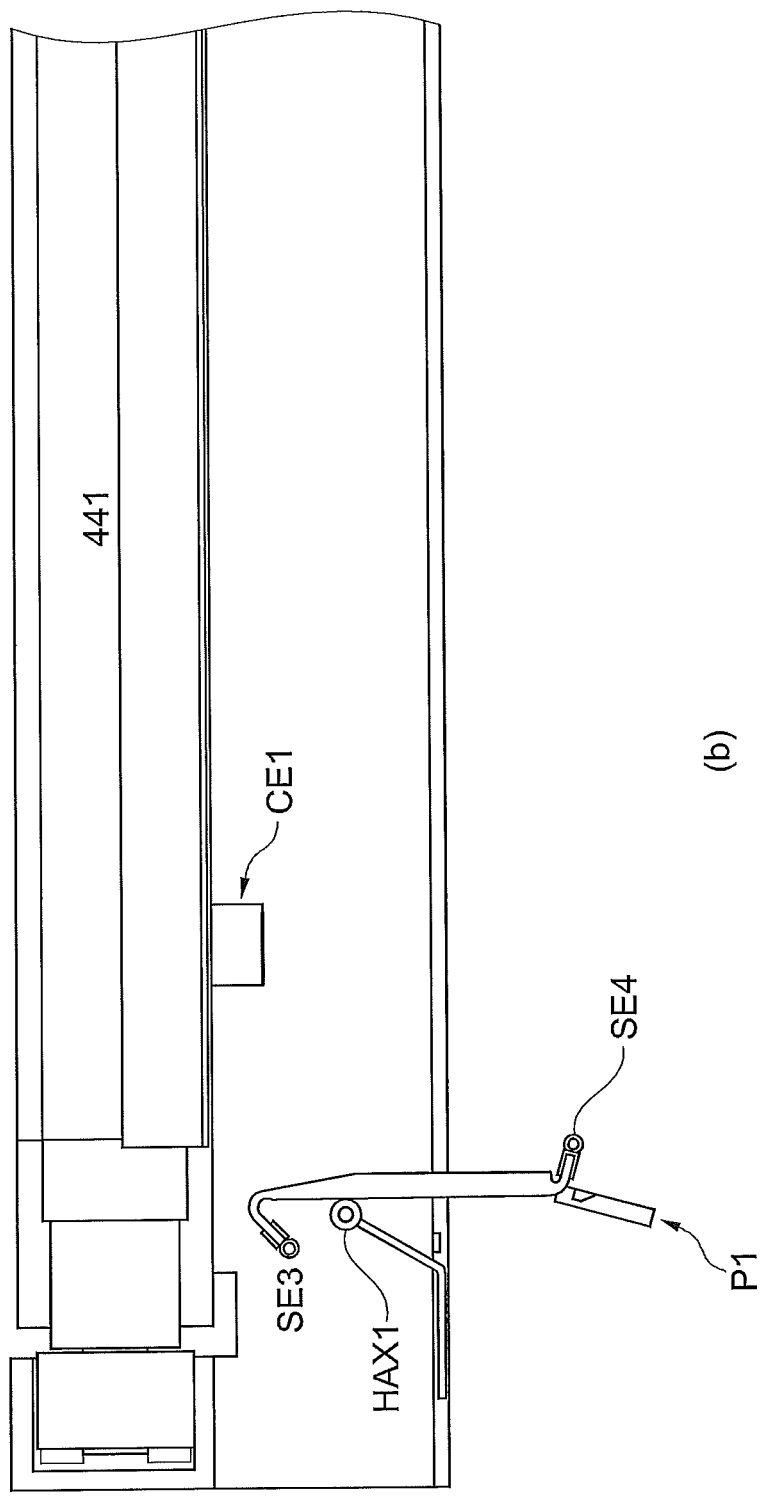

FIG. 14 shows another two simplified cross-sectional side views of an embodiment of the hatch cover. This embodiment provides that the sealing mechanism is provided by a hook-like or lever-like element H1, which can be rotated around a rotation axe HAX1. It can be advantageous to rotate the sealing as shown in FIG. 14 (a) and FIG. (b) instead of using a sliding mechanism as the one shown in FIG. 13. The sealing edges SE3 and SE4 are then provided at the ends of the hook/lever H1. P1 may then be pressed against a cylindrical extension CE1 from the hatch segments (here shown for 441, but a similar mechanism can be used for each segment 441 to 444). In order to improve the sealing, P1 may be fixed to CE1 with a screw. This screw has to be removed before opening the hatch and using the opening mechanism shown in FIG. 14 (a) and FIG. 14 (b).

Figure 15:
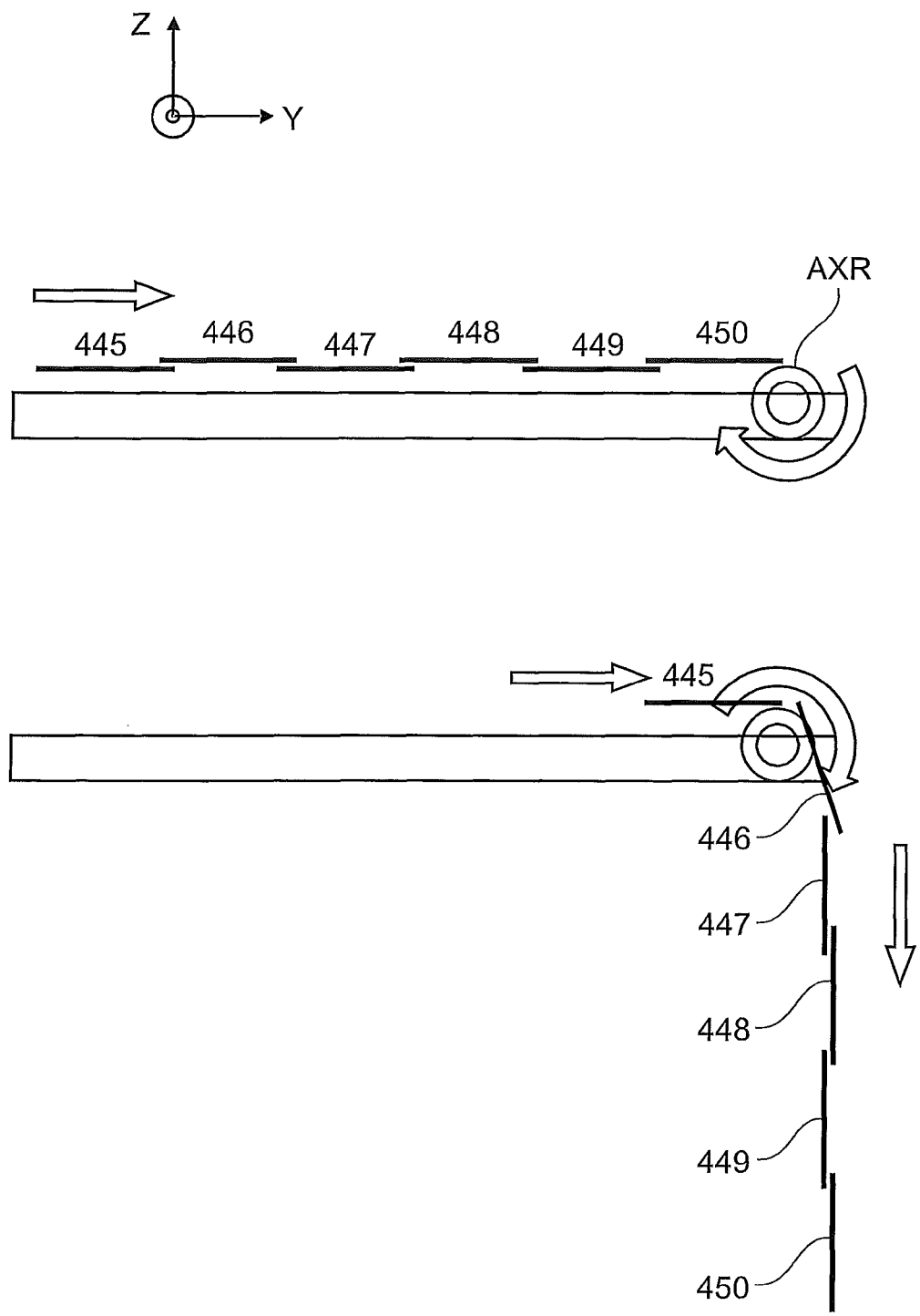
FIG. 15 is a simplified schematic cross-sectional side view on a hatch cover according to a third embodiment of the invention.

FIG. 15 is a simplified schematic cross-sectional side view on a hatch cover according to a third embodiment of the invention. The hatch cover 44 now comprises segments 445, 446, 447, 448, 449 and 450. Each segment may be stiff but pivotably connected to the respective next segment. This may then be used for configuring the hatch cover as a sliding roof. The segments 445 to 450 of the sliding roof may then be reeled in and reeled out around axis AXR for opening the hatch cover 44. This hatch cover is configured as a roller shutter or rolling shutter gate.

A wind driven power plant according to the present invention may preferably have a rated power of 5,000 kW or more. The rotor diameter may be more than 100 m, in particular 116 m or more meters. The number of blades of the rotor may be three. The generator may be synchronous and based on permanent magnetism. The converter type may be a four quadrant converter.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A wind power installation comprising:
a nacelle for a wind driven power plant;
a hatch opening located on a top side of the nacelle;
a hatch cover to cover the hatch opening, the hatch cover comprising a plurality of segments configured to remain within the hatch opening when a hatch is in an open position, and wherein the segments of the hatch cover are in an at least partially upright position when the hatch is open and a substantially horizontal position when the hatch cover is closed;
a movable sealing mechanism configured to engage the plurality of segments in a sealing position when the hatch cover is in the closed position and to retract from the sealing position in order to enable the plurality of segments to move; and
a helicopter hoisting platform, wherein the nacelle and the helicopter hoisting platform are configured such that the helicopter hoisting platform overlaps the nacelle in a longitudinal direction away from a rotor of the wind driven power plant and extends beyond the nacelle, wherein the nacelle is configured to at least partially integrate the helicopter hoisting platform in a vertical direction and partially integrate the helicopter hoisting platform in the longitudinal direction, wherein the helicopter hoisting platform is narrower than the nacelle in a transversal direction, and wherein the nacelle provides a recess for accommodating a part of the helicopter hoisting platform, the recess having a length in the longitudinal direction being shorter than a total length of the helicopter hoisting platform in the longitudinal direction and a height in the vertical direction being greater than zero.

2. The wind power installation of claim 1, wherein a top level of the helicopter hoisting platform is substantially on the same level with a top level of the nacelle.

3. A wind power installation comprising:
a nacelle for a wind driven power plant;
a hatch opening located on a top side of the nacelle;
a hatch cover to cover the hatch opening, the hatch cover comprising a plurality of segments configured to remain within the hatch opening when a hatch is in an open position, and wherein the segments of the hatch cover are in an at least partially upright position when the hatch is open and a substantially horizontal position when the hatch cover is closed; and
a helicopter hoisting platform, wherein the nacelle and the helicopter hoisting platform are configured such that the helicopter hoisting platform overlaps the nacelle in a longitudinal direction away from a rotor of the wind driven power plant and extends beyond the nacelle, wherein the nacelle is configured to at least partially integrate the helicopter hoisting platform in a vertical direction and partially integrate the helicopter hoisting platform in the longitudinal direction, wherein the helicopter hoisting platform is narrower than the nacelle in a transversal direction, and wherein the nacelle provides a recess for accommodating a part of the helicopter hoisting platform, the recess having a length in the longitudinal direction being shorter than a total length of the helicopter hoisting platform in the longitudinal direction and a height in the vertical direction being greater than zero, and wherein a top level of the helicopter hoisting platform is lower than a top level of the nacelle.

4. The wind power installation of claim 3, further comprising a corridor having elevated side walls for passing from the helicopter hoisting platform to the nacelle.

5. The wind power installation according to claim 1, wherein the helicopter hoisting platform extends the nacelle by more than one meter.

6. The wind power installation according to claim 1, wherein the nacelle defines a longitudinal direction along a length of the nacelle, a transversal direction along a width of the nacelle, and a vertical direction along a height of the nacelle, and wherein the plurality of segments are configured to be movable within the hatch opening in the transversal or the longitudinal direction.

7. The wind power installation according to claim 6, wherein each segment has at least one extension on each opposing side of the segment, and wherein at least some of the extensions are hook shaped extensions with a sealing edge comprising a gasket that engages another segment in the closed position to provide a sealing when in the closed position.

8. The wind power installation according to claim 7, wherein the hook shaped extensions comprise a first section and a second section that is transverse to the first section.

9. The wind power installation according to claim 4, including a movable sealing mechanism configured to engage the plurality of segments in a sealing position when the hatch cover is in a closed position and to retract from the sealing position in order to enable the plurality of segments to move.

10. The wind power installation according to claim 9, wherein each segment has at least one extension on each opposing side of the segment, and wherein at least some of the extensions are hook shaped extensions with a sealing edge comprising a gasket that engages another segment in the closed position to provide a sealing when in the closed position.

11. The wind power installation according to claim 10, wherein the wherein the hook shaped extensions comprise a first section and a second section that is transverse to the first section.

12. A wind power installation comprising:
a nacelle for a wind driven power plant, wherein the nacelle defines a longitudinal direction along a length of the nacelle, a transversal direction along a width of the nacelle, and a vertical direction along a height of the nacelle;
a hatch opening located on a top side of the nacelle, wherein the hatch opening has a hatch opening length extending in the longitudinal direction from a first opening edge near the rotor to an opposite opening edge;
a hatch cover to cover the hatch opening, the hatch cover comprising a plurality of segments configured to remain within the hatch opening when a hatch is in an open position, and wherein the segments of the hatch cover are in an at least partially upright position when the hatch is open and a substantially horizontal position when the hatch cover is closed;

a helicopter hoisting platform, wherein the nacelle and the helicopter hoisting platform are configured such that the helicopter hoisting platform overlaps the nacelle in a longitudinal direction away from a rotor of the wind driven power plant and extends beyond the nacelle, wherein the nacelle is configured to at least partially integrate the helicopter hoisting platform in a vertical direction and partially integrate the helicopter hoisting platform in the longitudinal direction, wherein the helicopter hoisting platform is narrower than the nacelle in a transversal direction, and wherein the nacelle provides a recess for accommodating a part of the helicopter hoisting platform, the recess having a length in the longitudinal direction being shorter than a total length of the helicopter hoisting platform in the longitudinal direction and a height in the vertical direction being greater than zero;

wherein the nacelle has a top surface defined by a nacelle width that extends between first and second top surface edges in the traversal direction, and wherein the helicopter hoisting platform has a top surface defined by a platform width that extends between first and second platform edges in the traversal direction, and wherein the first and second platform edges are spaced inwardly from the first and second top surface edges in the traversal direction; and wherein the opposite opening edge of the hatch opening is spaced from an end of the helicopter hoisting platform in the longitudinal direction such that a portion of the top surface of the nacelle extends between the hatch opening and the helicopter hoisting platform.

13. The wind power installation according to claim 12, wherein the first and second platform edges are spaced inwardly from the first and second top surface edges in the traversal direction for a distance of at least 0.5 meters.

14. The wind power installation according to claim 12, wherein each segment has at least one extension on each opposing side of the segment, and wherein at least some of the extensions are hook shaped extensions with a sealing edge comprising a gasket that engages another segment in the closed position to provide a sealing when in the closed position.

15. The wind power installation according to claim 14, wherein the hook shaped extensions comprise a first section and a second section that is transverse to the first section.

16. The wind power installation according to claim 14, including a movable sealing mechanism configured to engage the plurality of segments in a sealing position when the hatch cover is in a closed position and to retract from the sealing position in order to enable the plurality of segments to move.

* * * * *

UNITED STATES PATENT AND TRADEMARK OFFICE
CERTIFICATE OF CORRECTION

PATENT NO.         : 9,683,555 B2
APPLICATION NO.    : 13/997751
DATED              : June 20, 2017
INVENTOR(S)        : Joachim Arndt et al.

It is certified that error appears in the above-identified patent and that said Letters Patent is hereby corrected as shown below:

On the Title Page

In item (75), Inventors, Line 1; after "Arndt," replace "Loxsted" with --"Loxstedt--

In the Claims

In Claim 12, Column 12, Line 59; before "rotor" replace "the" with --a--

In Claim 12, Column 13, Line 4; before "rotor" replace "a" with --the--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*